Feb. 24, 1953  H. J. RUETENIK  2,629,216
VEGETABLE DIGGER
Filed March 18, 1950

INVENTOR.
HOWARD J. RUETENIK
BY
Hyde, Meyer, Baldwin & Doran
ATTORNEYS

Patented Feb. 24, 1953

2,629,216

UNITED STATES PATENT OFFICE 2,629,216

VEGETABLE DIGGER

Howard J. Ruetenik, Orwell, Ohio

Application March 18, 1950, Serial No. 150,371

6 Claims. (Cl. 55—108)

The invention relates to novel and improved apparatus for harvesting carrots, parsnips, or the like. An object of the invention is to provide means of this character wherein the only source of power is the tractive effort needed to advance the apparatus along the ground adjacent the row of carrots.

A further object of the invention is to provide means of the type indicated in the last preceding paragraph which, though novel, is extremely simple to construct and operate, and which can be manufactured economically from readily available structural parts.

Other objects and advantages will be apparent from a study of the following specification, in conjunction with the accompanying drawings, in which.

Figure 1:
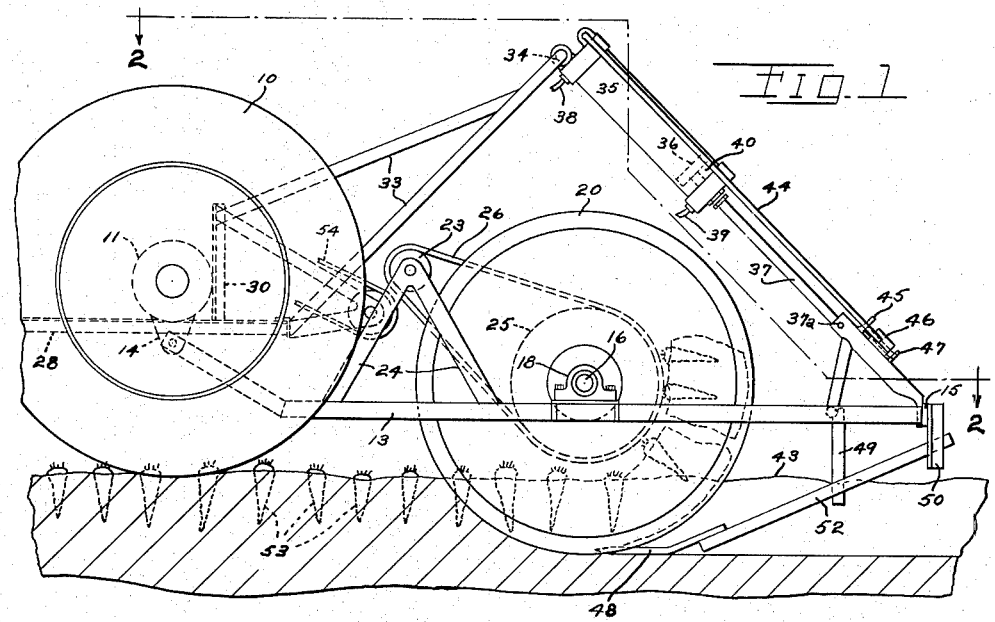
Fig. 1 is a side elevational view of one exemplification of my invention.

In describing the apparatus shown in the drawings I will refer, for convenience, to the digging of carrots. It is to be understood that this reference is for illustration only, and in no sense limiting, since the metes and bounds of the invention are to be determined from the appended claims.

The carrot digger shown in the drawings is normally towed behind any power driven vehicle such as a tractor or the like. Since the source of motion forms no part of the invention I have shown in the drawings only a fragmentary portion of such vehicle, the parts shown comprising a rear wheel 10 and a rear axle housing 11.

The carrot digger is supported on a pair of parallel shafts 12, 13 which are pivotally suspended from suitable lugs 14 on and below the rear axle housing. These shafts are spaced by cross members 15 and by an axle 16 journaled in bearings 17, 18 fixed respectively on shafts 12, 13. A pair of large wheel-like discs 19, 20 are fixed at spaced points on axle 16, each disc having a peripheral cutting edge. It will be obvious that as the shafts 12, 13 advance with the vehicle, traveling for example to the left in Figs. 1 and 2, the discs will penetrate soft earth to a depth determined by the softness of the earth, the weight supported on the discs, and by certain stop means hereafter to be described.

Each shaft has affixed thereto supporting means for the opposed ends of a roll 23, the supporting means in this case being the structural members 24. Between the discs, and rotatable therewith, is a drum 25 concentric with axle 16. A conveyor belt 26 extends around roll 23 and drum 25.

The tractor is provided with suitable means for lifting the apparatus comprising the shafts 12, 13, and the discs 19, 20. For this purpose I have here shown a sub-frame comprising the longitudinal structural members 27, 28 fixed to axle housing 11. A pair of uprights 29 and 30 are fixed on said structural members. A rearwardly overhanging supporting frame 33 extends upwardly and rearwardly from said sub-frame, and at the apex of the supporting frame is a cross bar 34 which pivotally supports a hydraulic cylinder 35 in which a piston 36 is reciprocable. A piston rod 37 at its upper end is connected to piston 36 and its lower end is pivoted at an intermediate point 37a to cross member 15. The cylinder 35 has suitable exhaust and intake pipes 38 and 39 for fluid power supply, the source of which is immaterial here, although it may be air or oil from a pump on the tractor.

It will be apparent that when pressure fluid is admitted to the pressure head 40 below piston 36, the piston moves upwardly, swinging the whole digger assembly around the pivot points on lugs 14, and lifting the disc edges out of the ground, namely out of the position shown in Fig. 1 wherein the ground level is at 43. The lifted position is of course the idle position.

A hollow rectangular frame member 44 is fixed at its top end to the cylinder end, and, at its bottom end, serves as a bottom stop for a finger 45 attached to the lower end of the connecting rod 37. It may be made adjustable by fixing a block 46 to this frame, and threading a bolt 47 through the block. The upper end of the bolt abuts finger 45 when the piston nears the low point in its travel, namely when the discs are imbedded to a maximum desired depth in the earth. The bolt of course may be advanced or retracted to vary the length of connecting rod travel.

Suspended from shafts 12, 13, and adjacent the lowest peripheral point of the cutting discs is a cutting blade 48 which is fixed in position by means of the depending structural members 49 and 50, and the blade struts 51 and 52. The blade in the embodiment shown is substantially tangential to discs 19, 20 and spans the space therebetween with a small working clearance. As the discs travel to the left (Fig. 1) the discs and blade cut a column of earth, rectangular in cross section, defined on the top by the earth's surface 43, on the bottom by the blade 48, and on the sides by discs 19 and 20.

Figure 2:
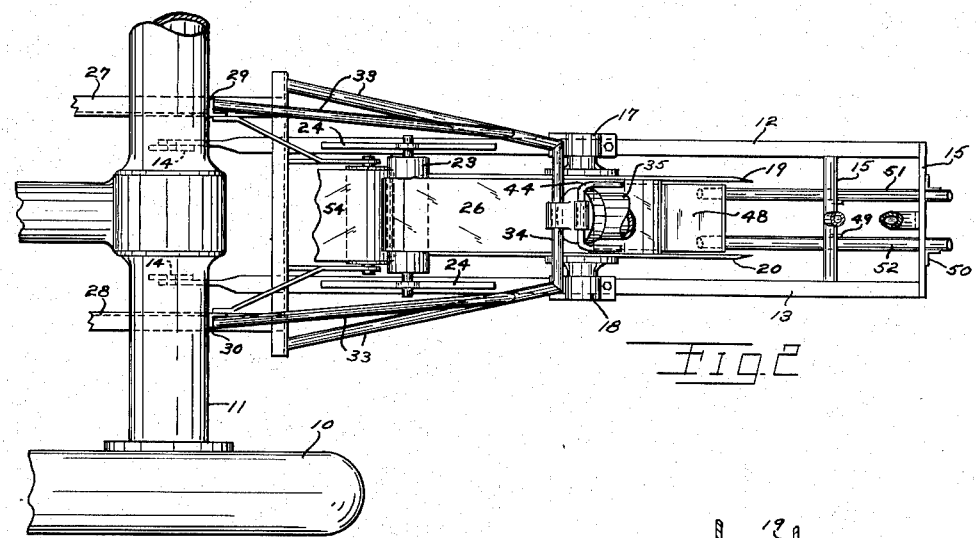
Fig. 2 is a top plan view as seen from the position of the line 2—2 of Fig. 1.

In Fig. 1 I show in broken line outline a row of carrots 53 which are straddled by discs 19, 20, the spacing between the discs being sufficient to safely clear the carrots on both sides. The depth to which the discs penetrate is predetermined to safely clear the lower tip of the carrots, so that the blade 48 advances below them.

The operation of the device is as follows. As the tractor and the digger advance, the rectangular column of soft earth is carried counterclockwise (Fig. 1) by adhesion between the discs until it travels up and around, and finally downwardly on to the upper surface of belt 26. I have shown a second belt 54, mounted on the subframe 28, 30 hereinabove referred to and driven by a suitable power source (not shown) on the tractor, this second belt receiving residual earth and carrots from belt 26, and conveying it forward to an operator who disposes the carrots in a container as desired.

I prefer to use oil in a closed system as a pressure fluid for cylinder 35. As hereinabove indicated, for raising the digger oil is admitted through pipe 39, driving the piston upwardly, and ejecting oil through pipe 38. When the digger is to be lowered the oil pump is reversed, and the piston is driven downwardly, thereby driving the discs and blade into the earth as the machine begins to move forward.

This digger works exceptionally well when the earth has a slightly moist adhesive characteristic such as it should have for the cultivation of carrots, beets, etc. I have tried out my invention extensively in normal types of earth suitable for vegetable growing, and I find it to be invariably successful.

Figure 3:
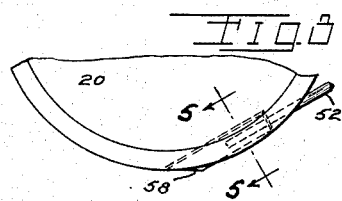
Fig. 3 is a fragmentary view showing another embodiment of my invention.
Figures 4, 5:
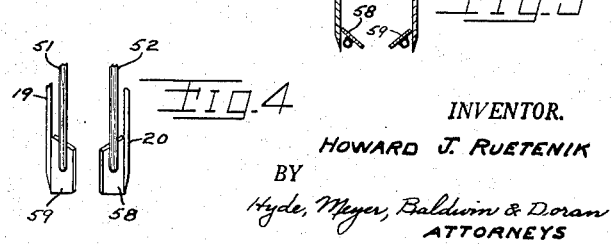
Fig. 4 is an end view of the device shown in Fig. 3.
Fig. 5 is a sectional view taken on the line 5—5 of Fig. 3.

Figs. 3, 4 and 5 illustrate another embodiment of my invention wherein, instead of one substantially horizontal blade, I use two blades 58 and 59 extending inwardly from cutting discs 19 and 20. These blades are inclined downwardly and forwardly from supporting struts 51 and 52, and also are canted downwardly and inwardly from the cutting discs. The main advantage of this type of cutting means is that it permits removal of certain types of vegetables without cutting the roots. The space between the knives allows the roots, or even part of the vegetable itself, to extend below the knife level.

It will be apparent that practically all parts of the machine can be formed from pipes, angles, sheet, and similar standard structural shapes, and that the apparatus, though novel, is extremely simple to construct and operate.

What I claim is:

1. A vegetable digger comprising a frame adapted for pivotally mounting on a motive source for moving down into and up out of a digging position and for varying the digging depth, a pair of spaced earth-cutting discs rotatably mounted on said frame for rotation about a common generally horizontal axis, said discs having mutually facing parallel inner faces extending perpendicular to said axis for straddling a row of growing vegetables when in digging position, said discs having sharpened circular peripheral cutting edges for cutting a pair of spaced slots in the earth when in digging position as the digger is advanced, and a cutting blade means secured to said frame and having a cutting edge located between said inner faces of said discs, said cutting edge being located approximately vertically below said axis and in the earth when in digging position, said cutting edge being located approximately the same distance from said axis as said peripheral cutting edges for forming simultaneously with the cutting of said spaced slots a generally transverse cut crosswise in the ground between the bottoms of said spaced slots for shearing off a vegetable-bearing earth strip so that rotation of said discs caused by rolling contact with the earth during forward travel of said digger will carry the vegetable-bearing earth strip cut by said discs and said cutting edge upwardly away from said cutting blade means and above said axis by adhesive contact of the earth strip with the inner faces of said discs, whereby said digger can dig said vegetables without making contact on said vegetables by either said discs or said cutting blade means.

2. A vegetable digger comprising a frame adapted for mounting on a motive source and capable of moving into and out of a digging position, a pair of spaced earth-cutting discs rotatably mounted on said frame for rotation about a common axis, said discs having mutually facing parallel inner faces for straddling a row of growing vegetables when in digging position, said discs having sharpened circular peripheral cutting edges for cutting a pair of spaced slots in the earth when in digging position as the digger is advanced, and a cutting blade means secured to said frame and having a cutting edge located between said inner faces of said discs, said cutting edge being located approximately vertically below said axis and in the earth when in digging position, the distance between said cutting edge and said axis being not substantially greater than the distance between said peripheral cutting edges and said axis so that said cutting edge forms simultaneously with the cutting of said spaced slots a generally transverse cut crosswise in the ground between said spaced slots for shearing off a vegetable-bearing earth strip so that rotation of said discs during forward travel of said digger will carry the vegetable-bearing earth strip cut by said discs and said cutting edge upwardly away from said cutting blade means by adhesive contact of the earth strip with the inner faces of said discs, whereby said digger can dig said vegetables without making contact on said vegetables by either said discs or said cutting blade means.

3. A vegetable digger comprising a frame adapted for mounting on a motive source and capable of moving into and out of a digging position, a pair of spaced earth-cutting discs rotatably mounted on said frame for rotation about an axis, said discs having mutually facing generally parallel inner faces for straddling a row of growing vegetables when in digging position, said discs having sharpened peripheral cutting edges for cutting a pair of spaced slots in the earth when in digging position as the digger is advanced, and a cutting blade means fixed with respect to said frame and having a cutting edge located generally between said inner faces of said discs, said cutting edge being located below said axis and in the earth when in digging position for forming approximately simultaneously with the cutting of said spaced slots a generally transverse cut crosswise in the ground between said spaced slots for shearing off a vegetable-bearing earth strip so that rotation of said discs during forward travel of said digger will carry the vegetable-bearing earth strip cut by said discs and said cutting edge upwardly away from said cutting blade means by adhesive contact of the earth strip with the inner faces of said discs, whereby said digger can dig said vegetables without making contact on said vegetables by either said discs or said cutting blade means.

4. A vegetable digger comprising a frame adapted for pivotally mounting on a motive source and capable of moving into and out of a digging position, a pair of spaced earth-cutting discs rotatably mounted on said frame for rotation about a common axis, said discs having mutually facing parallel inner faces for straddling a row of growing vegetables when in digging position, said discs having sharpened circular peripheral cutting edges for cutting a pair of spaced slots in the earth when in digging position as the digger is advanced, a cutting blade means secured to said frame and having a cutting edge located between said inner faces of said discs, said cutting edge being located approximately vertically below said axis and in the earth when in digging position, the distance between said cutting edge and said axis being not substantially greater than the distance between said peripheral cutting edges and said axis so that said cutting edge forms simultaneously with the cutting of said spaced slots a generally transverse cut crosswise in the ground between said spaced slots for shearing off a vegetable-bearing earth strip so that rotation of said discs during forward travel of said digger will carry the vegetable bearing earth strip cut by said disc and said cutting edge upwardly away from said cutting blade means and above said axis by adhesive contact of the earth strip with the inner faces of said discs, and a stripper and conveyor means secured to said frame and located above said axis, said last mentioned means extending outwardly from between the inner faces of said discs beyond the peripheral edges of said discs in the general direction of digger travel so that said vegetable-bearing earth strip is stripped from and carried outwardly from between said discs by the stripper and conveyor means as said discs rotate, the inner end of said stripper and conveyor means being located a radial distance inwardly from said peripheral edges at least equal to the depth of said slots cut by said discs, whereby said digger can dig said vegetables without making contact on said vegetables by either said discs or said cutting blade means.

5. A vegetable digger, as defined in claim 3, wherein said cutting blade means comprises a pair of blades with said blades extending inwardly from adjacent the respective inner faces of said discs, there being a substantial space between the inner edges of said blades, and said blades when in digging position being tilted downwardly, inwardly and forwardly with respect to the plane of the ground level.

6. A vegetable digger, as defined in claim 3, wherein said cutting blade means comprises a single blade extending inwardly from adjacent the respective inner faces of said discs.

HOWARD J. RUETENIK.

REFERENCES CITED

The following references are of record in the file of this patent:

UNITED STATES PATENTS

| Number | Name | Date |
|---|---|---|
| 1,088,260 | Copper | Feb. 24, 1914 |
| 1,367,853 | Beckwith | Feb. 8, 1921 |

FOREIGN PATENTS

| Number | Country | Date |
|---|---|---|
| 516,919 | Great Britain | Jan. 16, 1940 |